Jan. 31, 1928.
H. L. DECKER
1,657,855
ELECTRICAL INDICATING INSTRUMENT AND CONTROL SYSTEM THEREFOR
Filed Oct. 7, 1925   5 Sheets-Sheet 1
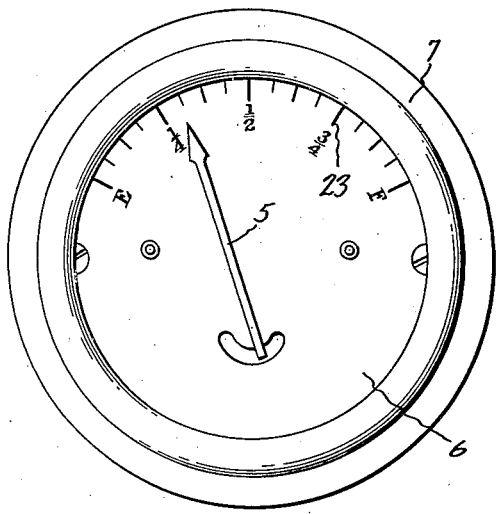
Fig. 1
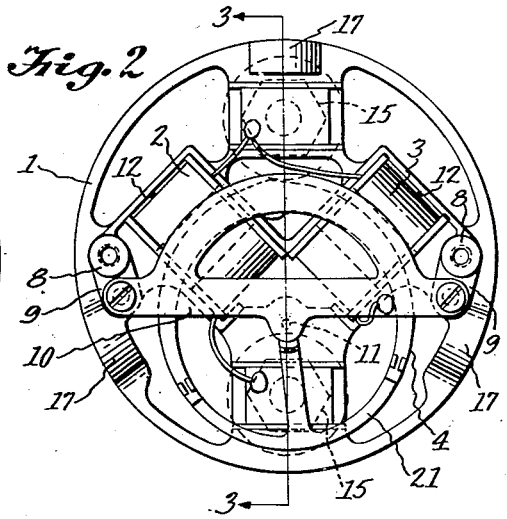
Fig. 2
Fig. 4
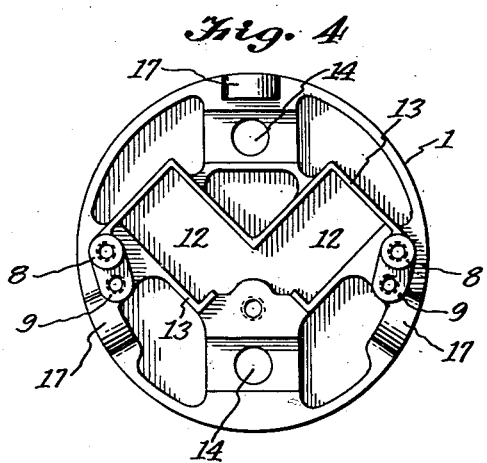
Fig. 3
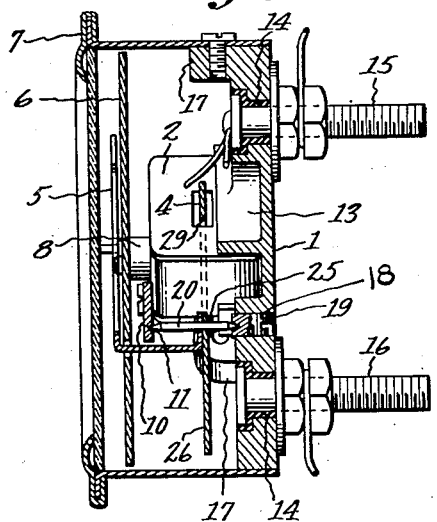
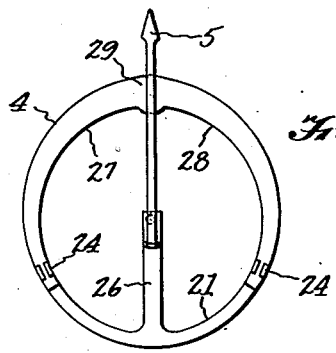
Fig. 5
INVENTOR
Hugh L. Decker
BY Owen & Owen
ATTORNEYS.

Jan. 31, 1928.
H. L. DECKER
1,657,855
ELECTRICAL INDICATING INSTRUMENT AND CONTROL SYSTEM THEREFOR
Filed Oct. 7, 1925    5 Sheets-Sheet 2
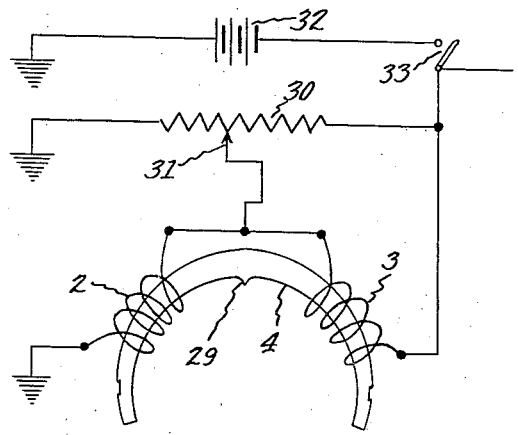
Fig. 6
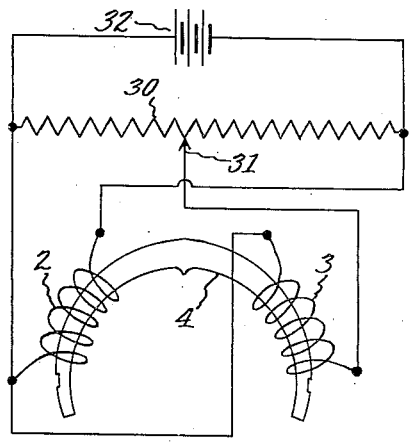
Fig. 7
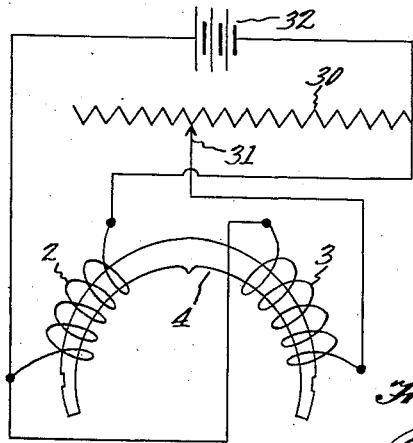
Fig. 8
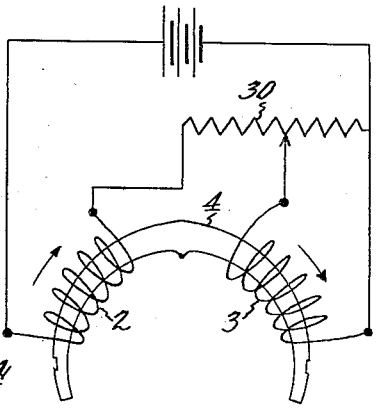
Fig. 9
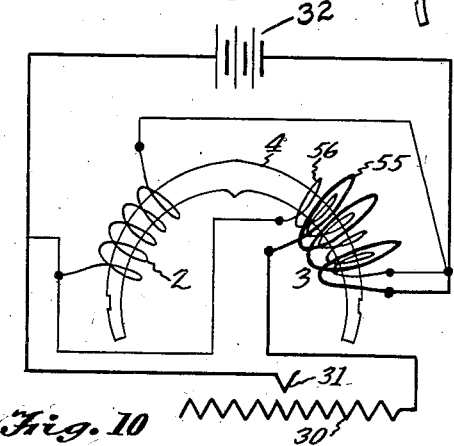
Fig. 10
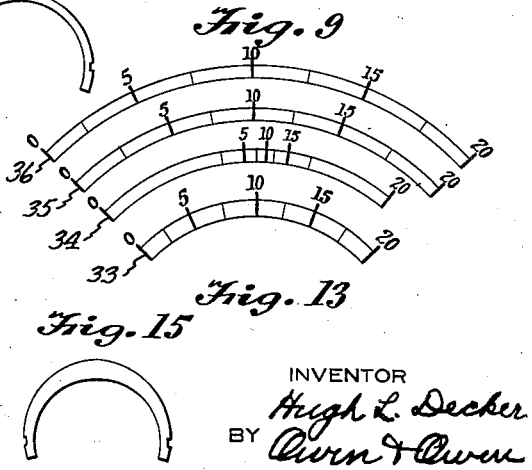
Fig. 14
Fig. 13
Fig. 15
INVENTOR
Hugh L. Decker
BY Owen & Owen
ATTORNEYS.

Jan. 31, 1928.
H. L. DECKER
1,657,855
ELECTRICAL INDICATING INSTRUMENT AND CONTROL SYSTEM THEREFOR
Filed Oct. 7, 1925   5 Sheets-Sheet 3
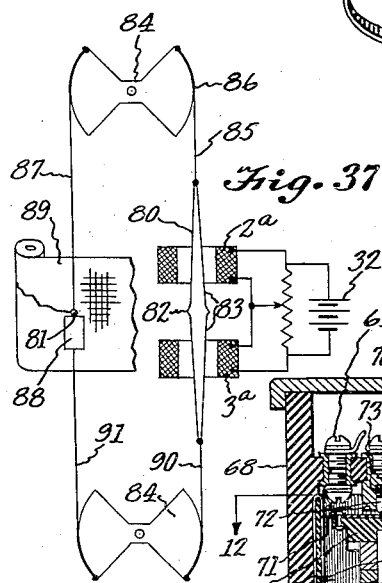
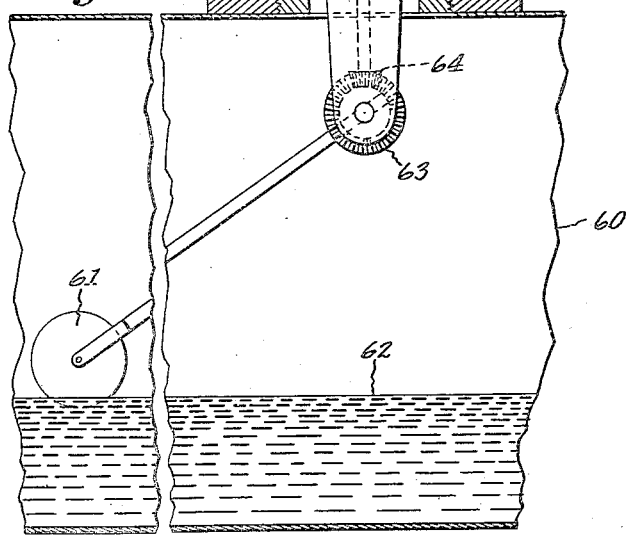
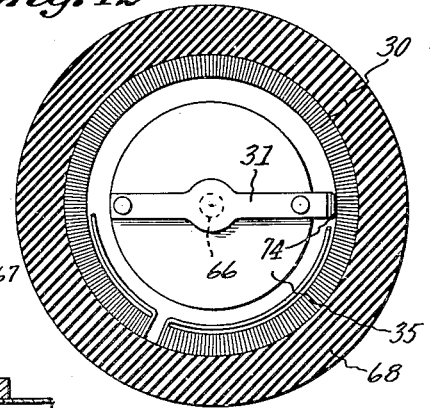
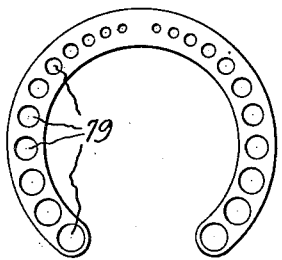
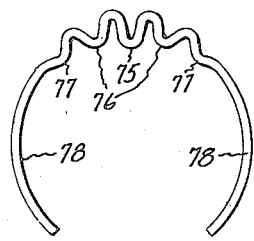
INVENTOR
Hugh L. Decker,
BY
ATTORNEYS

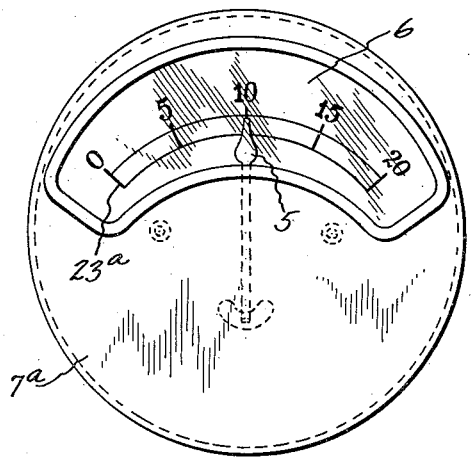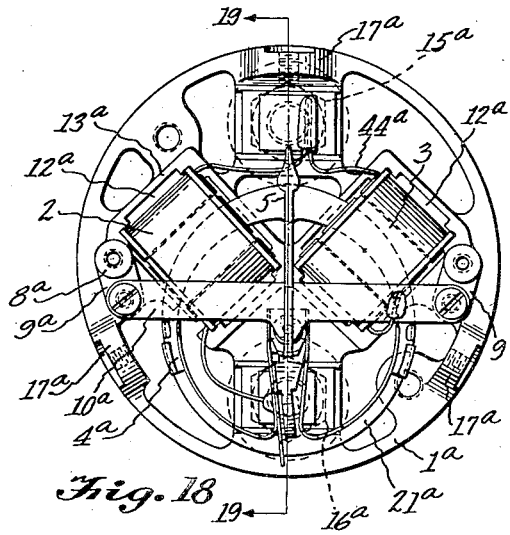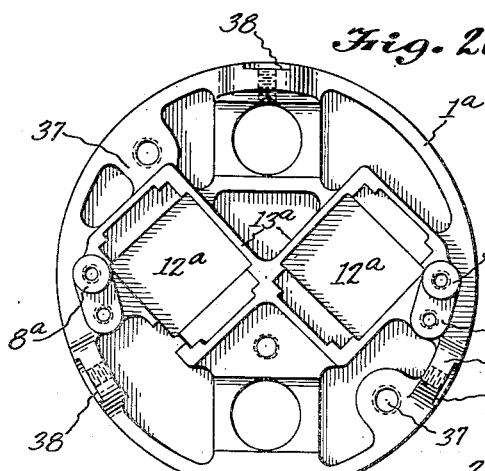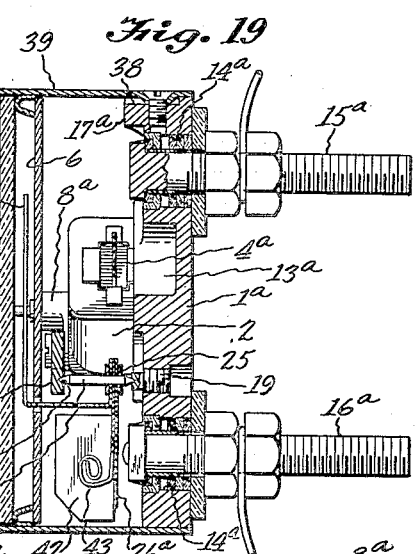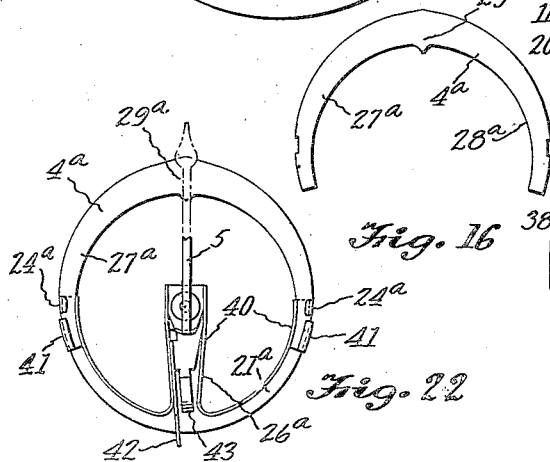

Jan. 31, 1928. 1,657,855
H. L. DECKER
ELECTRICAL INDICATING INSTRUMENT AND CONTROL SYSTEM THEREFOR
Filed Oct. 7, 1925 5 Sheets-Sheet 5

INVENTOR
Hugh L. Decker,
BY
ATTORNEYS

Patented Jan. 31, 1928.

1,657,855

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

ELECTRICAL INDICATING INSTRUMENT AND CONTROL SYSTEM THEREFOR.

Application filed October 7, 1925. Serial No. 61,112.

This invention relates to electrical indicating instruments and systems of control, and it particularly contemplates an indicating instrument for use in remotely controlled indicating systems and for other analogous purposes. This application is a continuation in part of my application of the same title Serial No. 754,229 filed December 5, 1924.

One of the objects of this invention is to provide a magnetic vane instrument that is adapted for operation on either alternating or direct current and that is capable of accurately indicating conditions existing at a remote station, independent of voltage variations in the transmitting circuit.

An additional object of this invention is to provide a rugged and efficient electrical indicating instrument for indicating any condition that may be translated or reproduced in changes of the current quantity relations transmitted through electric circuits connected to the instrument. The instrument and system herein disclosed has the particular quality of correctly indicating the relation of the flow of current in two or more circuits that are balanced one against the other.

Another object of this invention is to provide an instrument wherein the moving part is actuated by materially greater torque than was heretofore obtainable in indicating instruments of this general character.

Another object of this invention is to provide an instrument wherein the moving element is subjected only to a turning movement and wherein there will be substantially no unbalanced torque imposed on the moving vane by the actuating coils in directions parallel with the pivoted shaft of the moving element.

A further object of this invention is to provide an indicating instrument that incorporates an indicating vane of magnetizable material which is subjected to substantially the same total magnetizing ampere turns throughout its entire range of movement by a shifting magnetic field which the armature follows.

An additional object of this invention is to provide an indicating instrument wherein errors produced by residual magnetism in the moving element may be compensated for in the calibration of the instrument.

A further object of this invention is to provide an improved indicating instrument wherein the relative increment movements of the armature over different portions of the indicating scale may be controlled by changing the form of the armature.

A further object of this invention is to provide an indicating instrument having uniform scale graduations over the entire indicating range thereof for use in connection with a float operated rheostat particularly suitable for use in connection with automotive vehicles and the like to indicate variations in the level of fuel contained in the fuel tanks thereof.

A further object of this invention is to provide details of construction for instruments of the class referred to, that will permit their manufacture at a relatively low cost and provide an instrument having increased life and durability while maintaining its efficiency and accuracy of the indication. In the preferred embodiment of the invention herein illustrated, the instrument is provided with solenoids having substantially the same number of turns, and a soft iron armature that is movable within the solenoids and that is of sufficient length to substantially extend beyond the magnetic centers of the coils at all times, thus being subjected to the magnetic influence of both coils at all times. The magnetic fluxes induced by the current flowing through coils connected in the circuits of the instruments shown as illustrative of this invention, produce opposing forces on a magnetizable movable element, such as an armature of magnetizable material that is actuated by solenoids connected in the said circuits.

The details of the instrument, however, may be varied in form and in construction without departing from the spirit of the invention as set forth in the claims hereinafter appended. Instruments of this general character may also be employed in various capacities as indicators of electrical qualities depending upon the circuit connections of the systems with which they are associated. The coils of the instrument may comprise a polarizing coil and a variable coil, the first receiving at all times a uniform current to produce a substantially uniform degree of polarization in the armature, and the other being connected in the circuit in such manner that changes in the condition of the thing to be indicated produce changes in the current traversing the coil. Also, one of the coils may be used as a polarizing coil, and the other coil may be a compound coil, one of the compound coil elements functioning either as a counter-polarizing coil or a cooperative polarizing coil energized in accordance with the potential of the circuit, and the other compound coil element being energized by current flowing through a translating circuit and so connected to the translating circuit as to produce variations in the magnetic flux of the coil in accordance with changes in the thing to be indicated.

Thus it will be seen that the invention may be contained in structures of different forms and, to illustrate practical applications of the invention, I have selected certain instruments embodying the invention which serve as examples of various instruments containing my invention. These will be described hereinafter.

Figure 1 of the drawings illustrates a face view of the instrument.

Fig. 2 is a corresponding view of the operative parts of the instrument, the face of the instrument being removed.

Fig. 3 is a view of the section taken on the plane of the line 3—3 indicated in Fig. 2.

Fig. 4 illustrates a front view of the dismantled base of the instrument.

Fig. 5 is a plan view of the armature as it appears when removed from the instrument.

Figs. 6 to 10, inclusive, are diagrammatic illustrations of suitable control systems with which the instrument is adapted to be used.

Fig. 11 is a view, shown partially in section and partially in elevation, of an adjustable rheostat that is actuated in accordance with changes in the thing or condition to be indicated, such as changes in the level of a liquid, and that is adapted to be used in connection with the instrument herein illustrated.

Fig. 12 is a transverse sectional view of the adjustable rheostat taken substantially on lines 12—12 of Fig. 11.

Fig. 13 is a diagrammatic view showing the character of change that is produced in the graduations of the instrument when certain changes are made in the character and form of the armature.

Fig. 14 is a face view of a form of armature for which an instrument scale graduation is illustrated in Fig. 13.

Fig. 15 is an additional form of armature for which a typical scale graduation is shown in Fig. 13.

Fig. 16 is another typical form of armature for which a typical scale reading is illustrated.

Fig. 17 is a face view of a modified form of instrument constructed in accordance with my invention.

Fig. 18 is a view of the working parts of the instrument shown in Fig. 17.

Fig. 19 is a sectional view of the instrument shown in Fig. 17 taken substantially on the line 19—19 of Fig. 18.

Fig. 20 is a view of the base of the instrument shown in Fig. 18 with other parts removed.

Fig. 21 is a side elevational view of the base shown in Fig. 20.

Fig. 22 is an assembled view of the removed armature of the instrument.

Figs. 23 to 30, inclusive, are plan views of different forms of armatures adapted to be used in connection with the instrument herein described.

Figure 31:
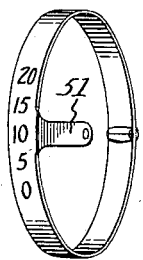
Figure 32:
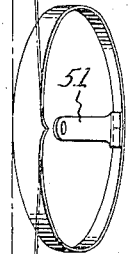

Figs. 31 and 32 are perspective views of modified forms of armatures adapted to be used in the instrument.

Figure 33:
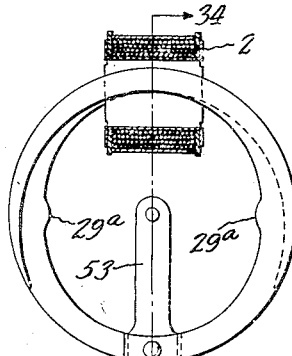

Fig. 33 is a diagrammatic view of a slightly different form of instrument embodying my invention.

Figure 34:
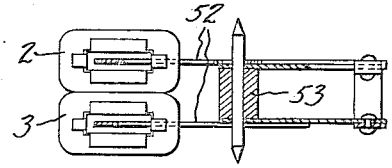

Fig. 34 is a sectional view of the instrument shown in Fig. 33 taken substantially on line 34—34.

Figure 35:
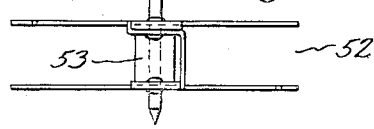

Fig. 35 is a side elevational view of the armature shown in Fig. 33.

Fig. 36 is a view in perspective of a modified form of armature adapted to be used in connection with the instrument shown in Fig. 33; and Fig. 37 is a diagrammatic view, partially in section, of an additional form of instrument incorporating my invention.

A preferred form of instrument incorporating this invention is shown in Figs. 1 to 5 inclusive, wherein a base 1 supports a pair of solenoid windings 2 and 3 and a magnetizable armature 4 that swings within the windings and that carries an indicator 5. A suitably calibrated dial 6 is visible through the transparent face of a casing 7 that encloses the operating parts of the instrument.

The base 1 is preferably a die casting made of a non-magnetic metal formed to receive and support the various parts of the instrument. It has a pair of dial-supporting pedestals 8 each of which has an offset shoulder 9 that constitutes a supporting post for a transverse bar 10 that has a pivot socket 11 formed therein. The base of the instrument also has a pair of recesses 12 formed by protruding flanges 13 that are so shaped as to receive and position the armature-actuating solenoids 2 and 3.

The base also has a pair of openings 14 formed therein for receipt of suitable connecting posts 15 and 16. A threaded opening 18 is also provided for a suitable pivot screw 19 that supports one end of the armature staff 20. Upstanding lugs 17 that are formed on the base are suitably threaded to receive screws that secure the case 7 to the base of the instrument.

The cross-sectional area of the solenoids 2 and 3 is preferably rectangular and oblong and the pivot bar 10 is so located in the instrument shown in Figs. 1 to 4, inclusive, as to substantially clamp and hold the solenoids against the base 1. Thus the solenoids are rigidly secured in position.

The movable element of the instrument comprises the armature 4 that is pivotally supported from a nonmagnetic frame 21 that is carried by the staff or arbor 20. The indicating vane 5 extends through an arcuate opening 22 that is formed in the dial 6 of the instrument and it is mounted on the armature staff 20.

The armature 4 is made arcuate in form in order that it may extend through and operate within the solenoids 2 and 3. In order to give ample arcuate movement to the indicator for the purpose of obtaining ample room for the scale graduations 23 over which the free end of the indicator moves, and also to give space for varible magnetic actuation of the armature, the axes of the solenoids form chords that preferably subtend about 45° of the arc described by the armature, thus leaving about 45° of the arc between the nearer ends of the solenoids as measured along the arc of the armature. This positions the magnetic centers of the solenoids about 90° apart as measured on the arc of the armature and provides a scale of about 90° as measured from the axis of rotation of the indicator vane. This degree of movement has been found to provide the desired length of scale for the ordinary electrical instrument.

The armature 4 is pivotally supported by the staff 20 which is supported between the pivot socket 11 of the plate 10 and the pivot screw 19 which is located in the base 1. In order to concentrically connect the armature with the pivot staff 20 and to properly space the ends of the armature during its assembly, thereby maintaining the proper magnetic relation of the armature with the solenoids, the tri-armed sheet metal supporting frame 21 has two of its arms connected to the ends of the armature 4 in suitably notched portions 24. The third arm 26 of the frame is secured to the staff by a suitable metal collar 25. The connection of the frame 21 to the ends of the armature may be made by any suitable means, such as by the ears that are bent around the armature and that respectively engage the notches 24. The sheet metal frame 21 thus completes a circular unit of which the armature forms a part. The oppositely extending arms of the frame 21 describe an arc of about 90° and separate the ends of the armature with nonmagnetic material over about 90° of the circle of which it forms a part. By positioning the supporting arm 26 of the frame on the side of the circular unit opposite the magnetic center of the armature, the armature assembly is afforded a range of movement of about 90°.

The armature 4 is formed of a soft iron having a pair of tapering portions 27 and 28 of greatest width at their adjoining ends which are located at the center of the arc described by the armature, which is also the magnetic center of the armature. Thus when the solenoids are energized, they respectively produce a drag on the armature tending to draw the larger portion of the armature to their magnetic centers, that is, to a point midway between the ends of the solenoids. The armature 4 also has a central enlargement 29 that is somewhat greater than that produced by the continuation of the tapering that is followed in forming all other portions of the armature. This particularly enlarged portion 29 is located at the center of the arc of the armature and is produced by inward and outward bulging of the inner and outer edges of the armature. It may be of the form shown in Fig. 2 and Fig. 5 of the drawings. This localized enlargement of the armature coacts with the magnetizing windings to maintain uniformity of the length of the divisions of the scale 23 to indicate the units of change in the condition of the thing measured, as for example, the unit of rise of the level of a liquid in a tank or reservoir. The relation of the tapering portions and of the enlarged portion of the armature to the form of scale graduations employed will be later explained in connection with Fig. 13.

The solenoids 2 and 3 may be wound and connected in a circuit or in circuits to produce a field of force that passes through both solenoids in the same direction, or they may be so connected as to produce fields of force in opposite directions with respect to the circle in which the armature is located. In the preferred form of construction they are so connected that they will operate in tandem on the armature, or, in other words, they are each so connected as to magnetize the armature in the same direction.

A connection of this character is shown in Fig. 6 wherein a potentiometer is employed to differentially energize the solenoid windings 2 and 3 respectively represented diagrammatically. A resistance coil 30, which is traversed by an adjustable contact member 31 that is actuated in accordance with the thing being indicated, is connected across the terminals of a battery 32. One terminal of each solenoid winding is connected to one of the battery terminals and the remaining terminal of each winding is connected to the adjustable contact member 31. The solenoid windings are thereby also connected in series across the terminals of the battery with their common terminals adapted to be connected to the adjustable contact member to differentially energize the solenoid windings. The system may be provided with a switch 33 that may also constitute the ignition switch of an automobile.

Inasmuch as the central parts of the electromagnets, that is the points that may be considered to be the magnetic centers of the windings, are located in radii of the arc of the armature that are practically 90° apart and since the poles of the solenoids produced by the current passing through them are in tandem relation to each other, a large number of the lines of magnetic force are caused to pass throughout the length of the armature, a portion of which extends into each coil for all positions since the armature extends over an arc of substantially 250°. The axis of each of the solenoids extends substantially at 90° to the radii through the center of the corresponding solenoid. As previously mentioned, the armature is of sufficient length to remain within the zone of influence of both of the solenoids at all times during the operation of the instrument. Preferably the armature extends completely through both solenoids at all times. Thus a portion of the field that passes throughout the length of the armature extends through both of the solenoids. This portion of the field may be created by either or both of the solenoids. The operation of each solenoid, however, is to magnetically draw the armature and to move it to a point such that the reluctance of the magnetic circuit will be minimum. Since the armature is tapered from its center towards both ends, each solenoid, if operating alone, will move the largest portion, that is, the portion 29 that has the largest cross-sectional area, to the magnetic center of the solenoid. When, therefore, the other solenoid receives current, there is an opposing drag on the armature produced by the solenoids, each acting against the other to place and maintain within the axis as large an amount of the magnetic material of which the armature is composed as possible, to reduce the relutance of the magnetic circuit of each solenoid to a minimum. The armature is thus moved by the solenoids until equilibrium is established or, in other words, until the quantity of magnetic material in the zone of influence of each winding is exactly proportional to the relative variations of the current in the solenoids. This is true because of the fact that each turn of the solenoid at all times is in position to cause the magnetic flux created by that turn to actuate or affect the armature. No single turn of the solenoid at any time is without power to produce its proportional effective influence on the armature whereby the resultant position of the armature is the result of the sum total of the magnetic influence created by all of the turns of both of the solenoids.

The defined center portion 29 of the armature is provided with a marked enlargement that maintains a more definite and positive relation with respect to the fields created by the solenoids, and it has been found to make the proportional movements of the armature to the relative current quantity that passes through the solenoids more accurate. The changes in the current of one of the solenoids, in the preferred form of the system, varies from zero to a certain maximum, while at the same time the other solenoid varies proportionately from maximum to zero. The enlarged portion of the armature thus moves from the magnetic center of one solenoid to the magnetic center of the other solenoid, remaining at all times within the zone of influence of both solenoids and receiving the cumulative energization of both windings.

If the armature were merely tapered and not provided with the marked enlargement, as will hereafter be explained by characteristic scale graduations, its condition during a part of the time would be that of a delicate balance, while at other times it would be disproportionately maintained in certain positions notwithstanding relative current changes in the solenoids. Consequently, it would not be accurately responsive to the current changes. In other words, there would be lack of definition of movement of such an armature. When the center of such an armature is in the center of either of the solenoids there would be a large amount of metal on either side of the center of the solenoid and consequently a small amount of current in the other solenoid in which a small amount of the metal of the armature is located, would cause a disproportionately small deflection. On the other hand, when the center of such an armature is located at a point in the arc of its movement midway between the ends of the solenoids, it would be in a balanced condition with reference to the fields produced by the solenoids and a slight increase of the current in one solenoid would cause the armature to move a distance disproportionate to the increase of the current of the said solenoid relative to the current of the other solenoid. The result of these differences in movements in the armature would require a longer scale division at the center of the scale than at the ends to express units of changes in the condition or amount of the thing to be measured.

The influence that changes in the taper of the armature and the form of the localized enlargement 29 have on the scale graduations of the instrument are diagrammatically illustrated in Fig. 13 which shows the comparative scale graduations for the different types of armatures respectively shown in Fig. 16, Fig. 14, Fig. 15 and Fig. 23. An armature of the type shown in Fig. 16, which is a preferred form, moves the indicator to the position shown in scale graduation 33 of Fig. 13 for step-by-step adjustments of the contact member 31 in the control system shown in Fig. 6. It will be noted that these graduations are substantially uniform throughout the entire range of movement and that equal steps in the movement of the contact member 31 along the rheostat 30 produces uniform angular movements of the indicator vane over the face of the instrument dial. There is a very distinct difference between the type of graduation produced by the armature of the form shown in Fig. 16 and of the form shown in Fig. 14. The scale graduation 34 of Fig. 13 indicates the movement of the indicator vane 5 produced by an armature of the form shown in Fig. 14. It will be noted that this series of graduations are erratic and that the steps are very uneven, being much longer at the end of the scale than in the center. The type of armature shown in Fig. 15, which is provided with tapered portions but which does not have a central enlargement such as the enlargement 29 of the armature shown in Fig. 16, produces a movement of the indicator digrammatically illustrated by the scale 35 in Fig. 13. A great improvement over the scale produced by the armature shown in Fig. 14 is indicated, but the armature shown in Fig. 15 lacks the degree of sensitiveness that is desirable over certain portions of the scale.

Figure 23:
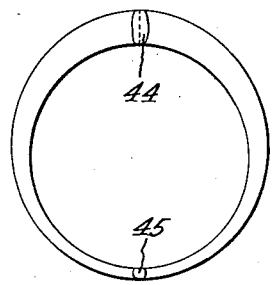

The type of graduation shown in scale 36, Fig. 13, is produced by a complete ring of magnetic material such as that shown in Fig. 23, or by an armature of the type shown in Fig. 16 with its ends joined to provide a complete magnetic ring. The readings for such an armature are substantially the same as for the armature with a gap between its ends.

The marked enlarged portion extends the fields at the ends of the solenoids that are nearer together as measured along the arc of movement of the armature, and when the current quantity in the solenoids changes one relative to the other, the armature is drawn a proportionate degree, while at the same time it is presumed that the increased field produced in the armature increased the drag to prevent movement of the armature beyond a certain point that might otherwise be due to the said relatively increased current in one of the solenoids. The marked increase in the cross-sectional area at 29 causes the armature to move the same unit of the arc throughout all parts of the arc upon each unit of change in the relative quantities of current that pass through the solenoids.

The solenoids as heretofore stated are preferably so connected as to operate in tandem on the armature. If the polarity producible by one of the solenoids is reversed, practically all of the lines of force inducted in the armature will leave the armature at the ends of the solenoids located nearer together as measured along the arc of the armature. This results in increasing the length of movement of the armature when the central portion of the armature is located between the solenoids. The maximum movement, due to a unit of change in the relative quantities of the current in the solenoids, is when the central portion of the armature is midway between the nearer ends of the solenoids. The units of length of movement at the ends of the arc described by the armature are greatly shortened to indicate the units of relative change of the current of the solenoids. Consequently connecting the solenoids other than in tandem renders the readings obtainable from the indicating means connected to the armature uncertain when residual magnetism remains in the armature after reversal of the cumulative magnetizing influence. The solenoids so arranged produce a beneficial dampening effect on the armature since practically all of the lines of force leave the armature at points between the nearer ends of the solenoids. Thus when there is any change of position of the armature the molecules or particles of the metal of the armature necessarily re-arrange their polarity which requires time, and consequently the armature is effectively dampened in its movement within the solenoids.

From the above relation of the magnetic and electrical circuits of the instrument, it will be seen that if the solenoids 2 and 3 both energize the armature in the same direction and if they are so differentially energized as to provide an increasing field in one coil and a proportionately decreasing field in the other coil during the operation of the instrument, the armature, acting as it does in the field of both coils, will be energized to the same cumulative degree for all positions.

Even the best commercial iron that is obtainable for use in constructing armatures of this character retains some residual magnetism after magnetization. This residual magnetism reacts with both coils and, if it is constant, its influence on the indications of the instrument will be constant and can be compensated for in the balancing of the armature and the graduation of the indicator dial. The degree of magnetization of the armature is maintained substantially the same for all positions within the operating range of the proposed instrument and therefore, the effect is compensated for by the balancing of the armature and the location of the scale graduations, thereby providing an instrument that correctly indicates the relative energization of the actuating solenoids over the ascending and descending scale of the instrument.

It will therefore be seen from the above description, that for this type of armature, the actuating coils produce a shifting magnetic field of substantially constant cumulative strength that acts upon an armature in such manner that the magnetic center of the armature moves to the magnetic center of the energizing influences.

Several control systems may also be used with the instruments herein described. For instance, one of the solenoids may act as a polarizing coil, and the other solenoid may be a current coil. This is shown in the system indicated diagrammatically in Fig. 8 wherein the terminals of a battery 32 are connected with one of the terminals of each solenoid winding. The other terminal of the battery is connected to the other terminal of solenoid winding 2 and resistance element 30. The remaining terminal of solenoid winding 3 is connected to the adjustable contact member 31. This follows the form of connection of a voltmeter and the armature will be moved according to the changes in the flow of current in the winding 3. The scale on the face of the instrument, being however, corrected to indicate the changes of the current produced by varying the resistance 30 or other translating current changes.

In the form of system shown in Fig. 10, one of the solenoids is formed of two windings 55 and 56. In this form of system, the solenoid winding 2 may be also connected with the terminals of the battery 32 for the purpose of polarizing the armature. The part 56 of the solenoid 3 may likewise be connected with the terminals of the battery and constitutes a potential coil, while the part 55 is connected in series with a translating circuit such as the adjustable resistance 30. The part 55 constitutes a current coil and, since these two parts of the solenoid operate upon the polarized armature, their joint operation is similar to that of the magnetic elements of a watt meter. The solenoid windings 2 and 56 will likewise operate on the armature to indicate changes in the flow of current through the resistance 30. The scale is however, calibrated for the service to which the instrument is to be adapted.

Fig. 7 shows a modification of the control system shown in Fig. 8 wherein the adjustable contact member 31 moves over a resistance winding connected across the battery 32.

The control system shown in Fig. 9 reduces the energy consumed by the indicator system. The number of turns of the solenoid windings 2 and 3 may be so related in the various control systems as to get many desirable indicating relations. Changes in the relative resistance of the windings and in the resistance of the rheostat 30 cause corresponding changes in the distribution of current to the various windings which may be utilized to produce different indicating effects.

As illustrative of a practical application of the instrument, I have shown a rheostat that may be connected to the instrument in the manner indicated in the diagram shown in Fig. 6 and in which the resistance is altered by the movement of a float that is raised and lowered by its buoyancy in accordance with the level of a liquid. The resistance of the rheostat, however, may be connected in any of the systems shown in the other figures. The float actuated rheostat may partake of different forms, the one shown in Fig. 11 being merely illustrative of rheostats of the type referred to. The rheostat is shown as connected to a gasoline tank 60 of the type commonly found on automobiles thus permitting the indicating instrument to be located at the instrument board of the automobile and be used to indicate to the driver the level of the gasoline in the fuel tank. A float 61 is raised and lowered by the gasoline 62 to actuate a bevel gear wheel 63 which operates on a bevel pinion 64. The pinion 64 is connected to a movable contact member 31 through an insulating block 35 and the rod or shaft 66. The resistance element 30 is wound upon an insulating ring 67 located, together with the contact 31, within the shell 68 that may also be formed of insulating material or may be provided with an insulating lining. The terminals of the resistance 30 are connected to the other parts of the system shown in Fig. 6 through the binding posts 69. A third binding post 70 electrically connects the contact 31 through a recessed member 71 in which is located a spring pressed bullet shaped plunger 72, placed in axial alignment with the rod or shaft 66. The plunger 72 is pressed against the contact 31 by the spring 73. The contact 31 has a depending tongue 74 that is, by reason of the elasticity of the metal of which the contact 31 is formed, yieldingly pressed against the turns of the resistance wire, of which the resistance 30 is formed. As the float 61 is raised or lowered by the change of the level of the liquid 62 the contact is moved so as to make contact with succeeding turns of the resistance wire to vary the quantity of current that flows through the divided circuits in which the solenoid windings 2 and 3 are connected. The indications of the vane 5 of the instrument are thus varied according to the level of the liquid in the gasoline tank.

The solenoids preferably have oblong rectangular openings through which the armature that is formed of sheet metal extends, so as to bring the turns of the solenoids as close to the sides of the armature as possible to produce the maximum magnetic effect on the armature. This enables the use of a high resistance coil in the rheostat and solenoids and reduces the quantity of current from the battery that is used in operating the instrument, which is of particular value when the instruments embodying my invention are connected to the batteries of automobiles. It is also of importance to note that there is no lateral drag produced on the armature. The position of the armature within the solenoid winding relative to the side walls of the opening therein does not change the drag on the armature, nor is there any tendency to pull the armature to one side or the other of the solenoid. This is particularly important since it reduces the drag on the pivot of the instrument and thus renders the instrument very sensitive.

The instruments shown in Fig. 1 to Fig. 5, inclusive, and in Fig. 17 to Fig. 22, inclusive, are assembled by first painting the inside faces of the pockets 12 with a relatively thick adhesive such as shellac, that also constitutes an insulating medium; the shellac is allowed to partially dry, the solenoids are then pressed into the pockets and the movable armature elements are mounted in place and adjusted by means of the adjustable pivot screw 19, the solenoids are next adjusted within the pockets to obtain the desired central position of the armatures. A filling material, such as a cement or heavy shellac, is next poured into the pockets around the coils to securely hold them in place.

If the resistance of the coils is not the same, then a relatively small length of resistance wire is connected in circuit of the coil of least resistance by adjusting the connection 30 in the manner described. This provides equal resistance in each of the coil circuits.

Certain desirable modifications of the instrument parts are shown in Fig. 17 to Fig. 23, inclusive, wherein like details of construction are numbered to correspond with the numerals used in Figs. 1 to 5, inclusive. One of the particular features of difference to which attention is invited in this modified structure is the supplemental threaded openings 37 formed in the base 1 by means of which the base is adapted to be mounted in position on an instrument panel (not shown). An additional feature is the provision of suitably depressed portions 38 in each of the ears 17$^a$ for receiving correspondingly depressed portions of the casing 39 in order that there shall be no projections extending from the exterior of the casing.

The transverse pivot bar 10$^a$ is also modified, as shown in Fig. 18, to simplify its construction and to provide only a pivotal mounting for one end of the staff of the indicator arm. In the structure shown in Figs. 18 and 19 it will be noted that the pivot bar here designated 10$^a$ does not contact with the solenoids 2 and 3 as in the previously described instrument. This avoids any flexing of the pivot bar by reason of pressure from the solenoid coils which might cause changes in the pivot mounting of the instrument.

Fig. 17 and Fig. 19 show an improved form of casing wherein only the upper end of the indicator arm is seen through the opening formed in the casing. This casing is also of a type that may conveniently be inserted from the back of an instrument panel to display only the transparent face of the casing. It also illustrates the adaptable character of the base 1$^a$ which may be used in connection with any desired form of bezel without substantial modification of other parts of the instrument. This is a matter of material commercial importance in instruments of this general character. It will also be seen in Fig. 18, Fig. 19 and Fig. 22 that there is a slight change in the form of armature used and in the mounting for the armature. Fig. 22 particularly shows an upstanding reinforcing flange 40 that is formed along the inner edge portion of the supporting frame 21$^a$, the supporting frame being preferably formed of non-magnetic material, as in the previously described instrument. The inturned ears here designated 24$^a$, that register with suitably notched portions of the armature differ somewhat from the previously described method of securing the armature to the frame. The inner face of the armature engages the outer face of the upstanding flange 40 and the connecting ears 24$^a$ register with the corresponding notched portion of the armature to position the armature relative to the supporting frame. Supplemental ears 41 formed on the frame 21$^a$ are bent over the ends of the armature to rigidly hold it in place.

In order to provide a damping mechanism and means for balancing the armature movement to insure easy calibration of the instrument, an integral damping vane 42 and a suitable balancing element 43 are supported from the mounting for the indicator vane. These elements may be formed as a single piece of metal that has one portion constituting the damping vane 42 and a second portion 43 that provides the counterbalancing for the armature and which is bendable to different positions to provide proper balance for the armature assembly.

In instruments of this general character, it is found that there are considerable variations in the resistance value of solenoids 2 and 3 when produced commercially. In order to provide a ready means for adjusting the resistance of two coils so that each coil has the same resistance as the other coil when the same number of turns are used in each, a lead of resistance wire 44$^a$ of about 10 ohms electrical resistance, the usual variation from standard, is connected to each of the solenoid windings 2 and 3. After the solenoid windings are mounted in their respective pockets 12ᵃ formed in the base, and after the remainder of the operating parts of the instrument are mounted in place, the coils 2 and 3 are balanced against each other by energizing the windings and by bringing the armature to a suitable central position by moving the point of contact of the terminal post 15 along the resistance wire 44ᵃ until the armature comes to the central position. The resistance wire 44 is then bent on itself at the point of contact, which balances the intrument coils, and is soldered or otherwise suitably connected to the contact post 15ᵃ, thus insuring equal resistance values in each coil. This feature of construction avoids the trouble of separately measuring the resistance of each solenoid winding and of matching the solenoid windings one against the other according to their resistance values to obtain windings of the same value in each instrument. Each of the windings 2 and 3 are formed of an identical number of turns in a suitable commercial winding machine.

The armature for the instrument may be modified in many ways to meet manufacturing conditions without departing from the invention. Fig. 23 to Fig. 36 show several such modifications.

The armature shown in Fig. 23 is formed of a pair of tapered segments welded at diametrically opposite portions 44 and 45. The increased metal content of the weld provides a portion at the weld 44 that functions in the same manner as the enlargement 29 of the armature shown in Fig. 5.

Figure 24:
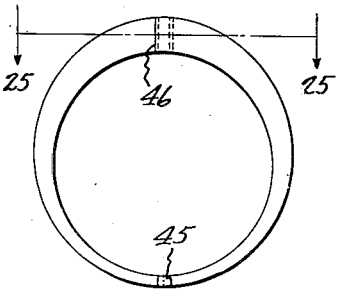
Figure 25:

Fig. 24 and the section of the armature taken on the line 25—25 shown in Fig. 25 show an armature in which a lapped or doubled portion 46 performs the functions of the enlargement 29 of the armature shown in Fig. 5.

Figure 26:
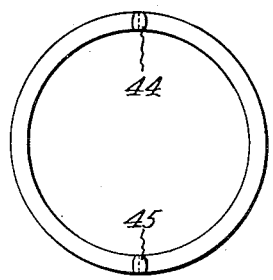
Figure 27:
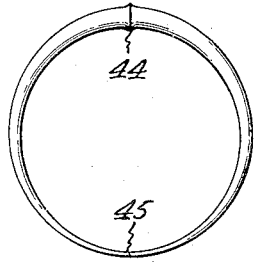

Fig. 26 shows a complete magnetic ring with oppositely welded portions 44 and 45 that serve to join the ring sections together. The metal content of either of these welded unions may function as the enlargement 29 of the armature. The armature shown in Fig. 27 is of tapered circular cross-section, the parts being welded together opposite portions 44 and 45. In any of the above welded armatures the armature parts may first be threaded through the solenoids 2 and 3 and then welded by suitable electrical welding apparatus. A suitable supporting bracket 21 may conveniently serve as means of mounting the armature.

Figure 28:
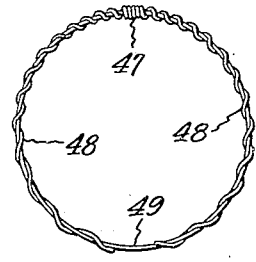

The armature shown in Fig. 28 is formed of magnetic wire wound on itself to provide a densely wound portion 47 that functions as the enlargement 29 of the armature shown in Fig. 5. This armature may either be formed of a single piece of iron wire or the outer ends 48 of a piece of iron may be wound about an endless base ring 49 of magnetic or non-magnetic material. The distribution of the winding about the base ring gives the effect of the taper of the armature 70 and the concentrated portion 47 of the winding functions as the enlargement 29.

The armature shown in Fig. 29 is formed of a short length of iron wire of substantially uniform cross-section throughout and having a series of bends 75, 76 and 77 of progressively decreasing size formed in the central zone of the wire to provide a defined central zone of increased magnetic effect. This form of armature may be pivotally supported from the arms 78 in any suitable manner.

A very durable armature of sheet metal of uniform width and thickness is shown in Fig. 30. This form of armature is caused to follow the magnetic center of the shifting magnetic field produced by the solenoids by reason of the defined zone of increased magnetic field produced at the center of the armature by forming progressively larger holes 79 in the armature on each side of its central portion. The magnetic effect is substantially the same as that produced by progressively tapering the armature.

The armature shown in Fig. 31 is of band form having its ends welded to provide an endless ring. The armature may either be suitably tapered or of uniform width. The enlargement of the weld 50 constitutes the localized magnetic central part of the armature. With an armature of this form, the graduations may be carried by the armature as shown.

The type of band armature shown in Fig. 32 is formed from a strip of soft iron bent to the form indicated in solid line and welded. The original form of the strip is shown in broken outline. An inwardly extending arm 51 of non-magnetic material constitutes a suitable support for armatures of the character shown in Fig. 31 and Fig. 32.

A modified form of instrument having materially greater range of movement is shown in Fig. 33, Fig. 34 and Fig. 35. The armature 52 is a continuous strip or band of metal, welded or otherwise joined, and threading each actuating solenoid. A suitable support 53 of non-magnetic material pivotally supports the armature. The solenoids 2 and 3 are disposed one over the other for this form of instrument. Each portion of the armature has a localized magnetic center 29ᵃ formed at each end of the range of movement thereof.

A band-like armature suitable for use in the instrument described in connection with Fig. 33 is shown in Fig. 36. This armature is also formed of a continuous strip of metal bent from the broken line position to the position shown in solid outline.

Fig. 37 shows a modified form of instrument embodying this invention wherein a pair of aligned coils $2^a$ and $3^a$ are connected across a battery 32 in accordance with the circuit relations shown in the control system of Fig. 6, the coils $2^a$ and $3^a$ respectively replacing coils 2 and 3 of the circuit of Fig. 6. The aligned coils $2^a$ and $3^a$ are preferably spaced in order to obtain a relatively wide range of movement. An armature 80 of magnetic material is adapted to reciprocate within the coils and to operate a recording pen 81. The armature 80 comprises a central zone of greatly reduced magnetic reluctance formed by the enlarged portions 82. A pair of tapered arms 83 extends from the enlarged central portion 82 of the armature to the zone of greatest magnetic intensity of each of the coils $2^a$ and $3^a$ under all conditions of operation. The armature is supported from a pair of pivotally mounted arms 84 by means of a flexible supporting cable 85 that is arranged to operate over the cylindrical face 86 of the arm 84, which is concentric with the pivotal center of the arm. A second flexible cable 87 serves to support a counter-balancing weight 88 that also carries the pen 81, which is of any suitable form adapted to produce records on a constantly moving chart 89, in accordance with the movements of the armature 80. The second armature supporting arm 84 is mounted at the base of the instrument and is connected to the armature 80 and the recording pen 81 by means of the flexible cables respectively designated 90 and 91. The principle of operation of this instrument corresponds closely to the principle of operation of the instruments previously described except that the armature here shown is adapted to reciprocate longitudinally through the aligned coils $2^a$ and $3^a$ in accordance with the relative energization of said coils instead of swinging arcuately through the coils. The combined weight of the pen 81 and of the counter-balance weight 88 is preferably the same as the weight of the armature.

Many other modifications in the application and construction of the indicating instrument herein disclosed can be made without departing from the invention. I desire, therefore, that the invention be limited only by the spirit and scope of the appended claims.

What I claim is:

1. In an electrical indicating instrument, a pair of solenoids, and an armature movable within the solenoids and extending at least to the magnetic center of each solenoid for each extreme operative position and adapted to be actuated jointly by the solenoids to a multiplicity of stable indicating positions.

2. In an electrical indicating instrument, a pair of solenoids, and an arcuate armature of magnetizable material movable within the solenoids and extending at least to the magnetic center of each solenoid for each extreme operative position and adapted to be actuated jointly by the solenoids to a multiplicity of stable indicating positions, said armature having a defined intermediate zone of materially reduced magnetic reluctance influenced by each solenoid.

3. In an electric indicating instrument, a pair of solenoids, an arcuate sheet iron armature extending completely through the center of each solenoid for all operative positions and having tapered arms extending arcuately from an enlarged portion.

4. In an electric indicating instrument, a pair of solenoids, an arcuate sheet metal armature of iron extending through the solenoids and having tapered arms extending arcuately in each direction from the center of the armature, the armature having a length sufficient to maintain itself at all times within the solenoids.

5. In an electrical indicating instrument, a pair of solenoids having axes located at an angle to each other, an armature of magnetic material oscillatably movable within the solenoids, the armature having a central body portion having a cross section area larger than that of any other part of the armature, the armature having a length sufficient to maintain itself at all times within the solenoids notwithstanding its oscillatory movements, the solenoids being so wound as to produce lines of force in the same arcuate direction in the armature.

6. In an electric indicating instrument, a rotatably supported armature of magnetic material extending through an arc less than 360°, a pair of spaced solenoids having their magnetic centers located at substantially equal distances from the center of rotation of the armature and spaced less than 180° apart, the said armature being movable within the solenoids and being of sufficient length to extend beyond the magnetic center of both solenoids in every operative position, and indicating means carried by the armature.

7. In an electric indicating instrument, a pair of spaced solenoids adapted to be differentially energized to different relative degrees, and a pivotally mounted armature of magnetic material adapted to remain at all times within the zone of influence of both of said solenoids thereby preventing critical response of said armature to the individual energization of either solenoid, said armature being adapted to be moved to a multiplicity of different indicating positions by the relative energization of said solenoids.

8. An electrical indicating instrument comprising a pair of spaced magnetizing windings adapted to jointly produce a magnetic field of substantially constant cumulative value having a shifting magnetic center, and an armature having a localized zone of greatly reduced magnetic reluctance movably mounted within said field, said zone of reduced magnetic reluctance being adapted to shift with the shifting of the magnetic center of said field, said armature having portions extending within the zone of greatest magnetic intensity of each of said windings at all times during the operation of the instrument.

9. An indicating system comprising a source of electrical energy, a plurality of windings adapted to be differentially energized therefrom to varying degrees to produce a linear magnetic field having a shifting magnetic center, said field being energized from a substantially constant cumulative number of ampere turns, an armature of magnetic material mounted to move within said field and provided with means causing it to follow the magnetic center of the field through a multiplicity of indicating positions, and indicating means actuated by the armature, said armature being formed of magnetic material and being of sufficient length to extend within the zone of greatest magnetic influence of each of said windings at all times.

10. An electromagnetic indicating instrument comprising a pair of solenoids, an armature of magnetic material having portions adapted to move within said solenoids, each of said portions comprising a tapered portion of magnetic material terminating in a localized enlargement of greater magnetic content than that resulting from the uniform taper, said enlarged portions being mechanically connected together.

11. An armature of magnetic material for instruments of the character specified comprising a crescent-shaped body portion having a localized enlargement disposed at an equal distance from each end thereof.

12. An armature for use in an electrical indicating instrument comprising a magnetic body portion of crescent shape extending around more than 180° of arc of a circle, said body portion being tapered to different degrees throughout its length, and a supporting bracket of non-magnetic material adapted to support said armature, a pivot staff upon which said bracket is mounted, said bracket and said armature having registering elements adapted to define the position of said armature relative to said pivot staff.

13. An armature for use in an electrical indicating instrument comprising a magnetic body portion of crescent shape extending around more than 180° of an arc of a circle, said body portion being tapered to different degrees throughout its length, a supporting bracket of non-magnetic material adapted to support said armature, a pivot staff upon which said bracket is mounted, said bracket and said armature having registering elements adapted to define the position of said armature relative to said pivot staff, and a combined damper vane and counter balancing weight carried by said bracket.

14. An armature for an indicating instrument comprising an arcuate body portion of magnetic material, notches formed at defined positions in said body portion, a bracket adapted to pivotally support said armature, and malleable ears formed on said bracket adapted to secure and position said armature relative to said pivotal support.

15. An electric indicating instrument comprising a pair of electromagnetic windings, a base adapted to support said windings, a contact post carried by the base, and a supplemental resistance wire connecting one of said windings with said post, said resistance wire being of sufficient electrical resistance to permit the balancing of the resistance values of said coils to provide a circuit through each coil of the same resistance value, said resistance wire being adapted to be electrically connected between said post and one of said windings at the point of resistance balance of said windings during the assembly of the instrument.

16. An indicating instrument comprising a base casting of non-magnetic metal having a pocket formed therein adapted to support and position an actuating coil, terminal posts mounted in said base, an electromagnet winding mounted within said pocket, and an armature pivotally supported from said base.

17. An indicating instrument comprising a base casting of non-magnetic metal having a pocket formed therein adapted to support and position an actuating coil, oppositely disposed dial supporting posts having offset seats formed thereon, a member adapted to seat on the offset portions of said posts to solely support one end of the pivotal mounting for said instrument, and an adjustable pivotal mounting carried by said base.

18. An indicating instrument comprising a base casting of non-magnetic metal having a pocket formed therein adapted to support and position an actuating coil, an actuating coil mounted in said pocket, a pivot mounting adjustably carried by said base, a fixed pivot mounting also carried by said base, a movable armature pivotally supported from said mountings, and a casing adapted to be secured to said base.

19. The method of manufacturing an indicating instrument that consists in forming a cast metal base of non-magnetic material with a coil receiving pocket, applying a relatively thick adhesive to the inside of the pocket, and pressing the coil into said pocket wherein it is maintained solely by said adhesive.

20. The method of manufacturing an indicating instrument that consists in forming a cast metal base of non-magnetic material with a coil receiving pocket, applying a relatively thick adhesive to the inside of the pocket, pressing the coil into said pocket, adjusting said coil to position within said pocket, and securing said coil permanently in said pocket by partially filling the spaces in said pocket around said coil with a cement whereby said coil is maintained in said instrument solely by said adhesive and said cement.

In testimony whereof I have hereunto signed my name to this specification.

HUGH L. DECKER.